United States Patent [19]
Doty

[11] Patent Number: 5,705,280
[45] Date of Patent: Jan. 6, 1998

[54] COMPOSITE MATERIALS AND METHODS OF MANUFACTURE AND USE

[76] Inventor: Herbert W. Doty, 22295 Green Hill Rd. Apt. 34, Farmington Hills, Mich. 48335

[21] Appl. No.: 772,234

[22] Filed: Dec. 23, 1996

Related U.S. Application Data

[63] Continuation of Ser. No. 346,554, Nov. 29, 1994, abandoned.

[51] Int. Cl.$^6$ .................................................. B22F 7/00
[52] U.S. Cl. ..................... 428/539.5; 428/552; 75/232; 75/235
[58] Field of Search ..................... 428/539.5, 552; 75/232, 235; 419/19

[56] References Cited

U.S. PATENT DOCUMENTS

| | | | |
|---|---|---|---|
| 3,526,485 | 9/1970 | Dawihl et al. | 29/182.5 |
| 3,718,441 | 2/1973 | Landingham | 29/182.1 |
| 4,998,578 | 3/1991 | Dwivedi et al. | 164/6 |
| 5,006,163 | 4/1991 | Benn et al. | |
| 5,006,308 | 4/1991 | Liu et al. | |
| 5,015,290 | 5/1991 | Tiegs et al. | 75/232 |
| 5,167,271 | 12/1992 | Lange et al. | 164/103 |
| 5,172,746 | 12/1992 | Corwin | 164/97 |
| 5,211,776 | 5/1993 | Weiman | 148/525 |
| 5,214,011 | 5/1993 | Breslin | 501/127 |
| 5,271,758 | 12/1993 | Buljan et al. | 75/232 |
| 5,316,866 | 5/1994 | Goldman et al. | |
| 5,322,109 | 6/1994 | Cornie | 164/97 |

OTHER PUBLICATIONS

Henager, C.H. Jr., J.L. Brimhall (1994) "Structure and Properties of Composites Synthesized In Situ Using Solid State Displacement Reactions" In Situ Composites: Science and Technology 61–80.

Dunand, D.C., J.L. Sommer, A. Mortensen (1993) "Synthesis of Bulk and Reinforced Nickel Aluminides by Reactive Infiltration" Metallurigical Transactions A, 24A:2161–2169.

Bystrzycki, J., J. Paszula, R. Trebinski, R.A. Varin (1994) "The microstructure and interface behaviour of Ni/NiAl composites produced by the explosive compaction of powders" Journal of Materials Science 29:6221–6226.

Lu, L., Y.S. Kim, A.B. Gokhale, R. Abbaschian (1990) "Reactive Synthesis of NbAl$_3$ Matrix Composites" Mat. Res. Soc. Symp. Proc. 194:79–87.

Brzeski, J.M., J.E. Hack, R. Darolia, R.D. Field (1993) "Strain aging embrittlement of the ordered intermetallic compound NiAl" Materials Science and Engineering A170:11–18.

Rigney, J.D., J.J. Lewandowski (1992) Materials Science and Engineering pp. 31–45, "Effects of Reinforcement Size and Distribution On Fracture Toughness of Composite Nickel Aluminide Intermetallics".

Locci, I.E. et al. (1990) "Microstructure and Mechanical Properties of a Single Crystal NiAl Alloy with ZR or HF Rich G-Phase Precipitates" High Temperature Ordered Intermetallic Alloys IV, MRS Conf. Proc. 273:278–283.

(List continued on next page.)

*Primary Examiner*—Kathryn L. Gorgos
*Assistant Examiner*—Chrisman D. Carroll
*Attorney, Agent, or Firm*—Saliwanchik, Lloyd & Saliwanchik

[57] ABSTRACT

This invention relates to composite materials and the production of composite materials that are designed for use under high stress and at high temperatures. More particularly, this invention relates to materials suited for use in turbine engines, such as those used in aircraft, that must withstand high temperature, high stress, corrosion and oxidation. The invention specifically relates to composite materials which have alloy matrices, e.g., nickel aluminide, reinforced with a substantially continuous, interpenetrating, and interconnected network of a metal oxide. These composite materials have superior properties as compared to superalloys, intermetallics, ceramics, or artificially reinforced materials.

2 Claims, 2 Drawing Sheets

OTHER PUBLICATIONS

Alman, D.E., N.S. Stoloff (1991) "Powder Fabrication of Monolithic and Composite NiAl" The Internal Journal of Powder Metallurgy 27(1):29–41.

Hack, J.E., J.M. Brzeski, R. Darolia (1992) "Evidence of Inherent Ductility in Single Crystals of the Ordered Intermetallic Compound NiAl" Scripta Metallurgica et Materialia 27:1259–1263.

Miracle, D.B. (1993) "Overview No. 104—The Physical and Mechanical Properties of NiAl" Acta Metall. Mater. 41(3):649–684.

Barinov, S.M. et al, "Zirconia—Toughening of Nickel Aluminide", *Acta Metall. Mater.*, vol. 41, No. 3, pp. 801–804, 1993.

COMPOSITE MATERIALS AND METHODS OF MANUFACTURE AND USE

This application is a continuation of application Ser. No. 08/346,554, filed Nov. 29, 1994, now abandoned.

This invention was made with Government support under Grant ONR #N00014-91-J-4075 awarded by the Defense Advanced Research Projects Agency. The Government has certain rights in the invention.

FIELD OF THE INVENTION

This invention relates to composite materials and methods of producing the composites for use as structural materials in articles of manufacture designed for high stress and high temperature applications. More particularly, this invention relates to composite materials suited for use in turbine engines, e.g., those used in jet engines, that must withstand corrosion and oxidation in addition to the extreme stress and temperatures during operation of the engines.

BACKGROUND OF THE INVENTION

Materials that can be used under conditions of extremely high temperatures have been the subject of a great deal of research. Some of the most demanding uses for such materials are in turbine engines, especially those of jet engines of military or commercial aircraft. Many materials have been shown to exhibit some of the properties necessary to perform under such hostile conditions, but none have been found or produced that exhibit all the necessary properties, including: strength, durability, and resistance to corrosion and oxidation, especially under exposure to high temperatures for extended periods of time.

For the next generation of jet engines, increasingly hostile operating conditions are anticipated. The expected increase in operating temperatures is driven by the competing demands of increased performance and reduced fuel consumption. To achieve the combined goals of increased performance and lower fuel consumption, it is necessary to design engines that can operate efficiently at substantially higher peak and operating temperatures. Operating temperatures 25 to 50 percent greater than current designs are expected and may become commonplace. Additionally, applied stresses will increase due to higher engine speeds and compressions. These factors demand materials with useful mechanical properties at temperatures approaching 2000K in a corrosive, oxidizing environment.

Superalloys using a mixture of various elements have been relatively successful as structural materials. Theoretically, superalloys take advantage of the benefits provided by each component of the superalloy (see, e.g., U.S. Pat. No. 5,006,308). Complex alloys typically comprise nickel and a combination of many other elements. Aluminum- or cobalt-based superalloys have also been used. However, complex superalloys have nearly reached their full potential for use as structural materials. For example, these superalloys typically have a melting temperature of about 1300°–1400° C. Thus, they are routinely expected to perform at temperatures up to 85% of their melting temperature. Consequently, superalloys are unsuitable in even modest temperature increases unless other design changes are made to protect and internally cool them.

Internal cooling is one technique that is currently employed so that superalloys can be used in high combustion temperature engines. Automobile engines, for example, can have combustion temperatures of more than 2400° C., which is well in excess of the melting point of aluminum alloys that contact the combustion chamber. Obviously, any interruption in the internal cooling system results in a very rapid rise in the temperature of the component and can lead to catastrophic failure.

Methods to control grain structures in the formation of superalloys and to prepare components as single crystals have also been employed in order to enable the use of alloys in high temperature combustion engines (see, e.g., U.S. Pat. No. 5,006,163 and U.S. Pat. No. 5,316,866). However, these methods use expensive materials and are tedious to perform, which results in increased manufacturing time and associated costs. In addition, such superalloys are subject to oxidation and corrosion, especially at high temperatures. As a general rule, superalloys that have the best mechanical properties at high temperatures often are the least resistant to oxidation and corrosion. A common approach to protect the superalloys from environmental factors is to apply a coating to one or more of the superalloy components. See U.S. Pat. No. 5,316,866. Interactions between the substrate and coating and thermally induced stresses at the substrate/coating interface are inherent problems associated with coatings. Thus, degradation, cracking, and spalling of the coating can result. Additional manufacturing time and costs are also disadvantages of the coating process.

Intermetallics and ceramics have been considered for high stress and high temperature uses.

Ceramics generally are highly resistant to oxidation. Aluminides and silicides exhibit oxidation resistance by reacting with the oxygen in the atmosphere to form a protective oxide layer. Silica ($SiO_2$) is subject to allotropic transformations and softening above 1250° C., which renders it inferior to alumina ($Al_2O_3$) as a protective outer coating in a thermally cycled, mechanically stressed application.

Intermetallics, e.g., $MoSi_2$, $NbAl_3$, and NiAl, generally have the advantage of high thermal conductivity which reduces thermal gradients of the different materials. Nickel aluminide (NiAl), for example, has a relatively high fracture toughness (6.0 MPa$\sqrt{m}$). NiAl offers the advantageous combination of a high melting point (1682° C.), low density (5.88 g/cm$^3$), and excellent corrosion resistance. Nickel aluminide (NiAl), a stoichiometric intermetallic, has four to eight times the thermal conductivity of nickel based superalloys. NiAl also has a high enthalpy of formation, which indicates excellent thermodynamic stability, a simple B2 crystal structure, and a wide solubility range.

At least two aspects of the mechanical behavior of aluminides have, in the past, been obstacles to their successful utilization: low temperature damage tolerance and rapid loss of yield strength at elevated temperatures. These characteristics are common to many intermetallics, including NiAl. Another disadvantageous property of NiAl is its high thermal expansivity relative to other materials used in turbine engines. This requires designers of turbine engines to loosen tolerances to allow for the expansion of NiAl components as the engine heats to operating temperatures. Additionally, this high expansion rate has hindered composite development, because many of the primary choices for reinforcement materials expand at a much lower rate. This mismatch induces the build up of residual stresses in both the matrix and reinforcement during thermal cycling. In many systems, these residual stresses become greater than the fracture stress of NiAl, which leads to cracks in the matrix at the reinforcement/matrix interface. Both intermetallics and ceramics have the disadvantage of being highly brittle.

Various approaches have been used to overcome the detrimental mechanical behavior of aluminides, e.g., NiAl, and other similar materials, but each has been met with only limited success. The various approaches include the use of thermomechanical treatments which provide more mobile dislocation (Brzeski et al., 1993; Hack et al., 1992), alloying that incorporates stable phases with a sufficient number of active slip systems (Miracle, 1993), dispersion strengthening which increases the fracture stress (Locci et al., 1990), reactive synthesis and compaction during diffusion bonding or sintering (Lu, 1990), and compositing with various reinforcements which exploit one or more of a variety of toughening and strengthening mechanisms (Barinov and Evdokimov, 1993; Rigney and Lewandowski, 1992).

Compositing, or the formation of a composite, refers to the consolidation of two or more materials that have been specifically chosen to exploit the advantageous properties of each of the component materials. The usual result of compositing is a material having properties which are intermediate between the two individual materials. A composite generally comprises a component forming a matrix, and a second component which associates with the matrix. The second component can act as a reinforcement for the matrix. However, creating a superior composite material involves much more than the mere combination of two materials having desirable properties. The properties of composites are controlled by the nature of the matrix/reinforcement interface, the geometry and volume fraction of the reinforcements, and the type and geometry of the loading, in addition to properties of the materials.

Composites can be arbitrarily classified into two distinct groups: natural (or in situ) composites, and artificial composites. Natural composites are formed from a chemical reaction in which the materials are combined. Generally, the component materials in natural composites are in equilibrium.

Artificial composites, on the other hand, are formed by the mechanical addition of one material to another. The phases of an artificial composite are generally not in equilibrium, which can produce undesired physical changes when the phases interact. One method of solving the problem of non-equilibrium is to place a diffusion barrier coating at the interface of the two phases; however, the previously discussed disadvantages of coatings are not overcome by this approach.

There are various types of artificial composites, including those that employ particle or fiber reinforcements. Materials used as reinforcements can be ductile or brittle. Previous attempts to improve materials by use of fibrous reinforcements involved the artificial or mechanical addition of fibers. For example, attempts to develop composite materials for use in turbine engines have been made using an added reinforcement material. However, merely mixing materials together in an attempt to arrive at a matrix/reinforcement combination has failed to achieve a composite that can overcome the inherent problems of the relationship between the length and diameter of the reinforcements, interfacial bond strength, and thermal expansion mismatch.

A composite fabrication method suited to intermetallic matrix composites is powder processing or powder metallurgy (PM). In PM procedures, pressure and heat are applied for a definite length of time to the powder/reinforcement mixture in order to combine the component materials. Powder metallurgy procedures are usually carried out in a hot press (HP) or hot isostatic press (HIP). Reactive-hot-compaction (RHC) schemes typically involve 2 hours at 1200° C. in the hot press followed by a second step of 1–2 hours at 1300° C. in a HIP at up to 100 MPa. The powders can be pre-alloyed to a desired composition, or a mixture of elemental powders, in the desired amounts, can be consolidated by powder processing.

No methods, including RHC methods, have resulted in oxidation- or corrosion-resistant materials suitable for use in high stress and high temperature conditions, as in jet engines or advanced aerospace applications. In situ synthesis of $MoSi_2$-SiC composites via solid state displacement reactions and co-synthesis have been reported recently (Henager et al., 1992; Alman and Stoloff, 1993). However, silicide compounds do not retain their resistance to oxidation. Any outer layer of $SiO_2$ that may form is subject to allotropic transformations and softening, as previously discussed.

The subject invention provides an oxidation-resistant composite which comprises an intermetallic matrix and an interpenetrating, interconnected, continuous network of reinforcement which previously described materials have lacked. Neither have previously known materials possessed a high interfacial bond strength coupled with a high thermal expansion coefficient mismatch where the matrix and a reinforcement are of a suitable diameter so that mechanical stresses can be dispersed over a large portion of the material. These characteristics define a very strong, thermally conductive material. A simple and efficient processing technique, capable of being widely applied to produce the materials for high temperature combustion engines, including in aircraft engines and for advanced aerospace applications, is provided by the subject invention and which also is heretofore not described.

BRIEF SUMMARY OF THE INVENTION

The subject invention concerns a novel composite material and processes for producing and using the composite. The invention specifically relates to a three-dimensional composite material comprising an metal alloy matrix which is interpenetrating and reinforced with a substantially continuous, interconnected network comprising a metal oxide. In one embodiment, the composite comprises a metal alloy matrix, where the metal alloy comprises at least two different metallic elements, and a reinforcement network comprising a metal oxide. Advantageously, the reinforcement network of the subject invention is substantially continuous, interconnecting, and interpenetrating in relation to the matrix.

One object of the invention is to provide a simple, inexpensive process for producing high-quality composites which have excellent heat resistance, oxidation resistance, strength, and durability. One preferable application of the subject process is in the areas of intermetallic and ceramic matrix composites for use as a structural material, where the high heats of formation of the matrices aid in the formation of the reinforcement network.

The composite of the present invention can be formed by a combination of chemical reaction of the matrix, externally supplied pressure, and the evolution of the intense heat of formation of the matrix. The subject process comprises controlled reactive processing which results in the formation of the desired phases in the final product, e.g., the metal oxide reinforcement network and the alloy matrix. The subject process comprises the steps of (1) treating, under hydrating conditions, one or more of the metal elements used as components of the matrix to form a layer of metal oxide on the metal component, (2) mixing the matrix components, wherein one or both of the components have been treated as in step (1), to form a reaction mixture, and (3) compositing the matrix components and metal oxide by consolidation, e.g., reactive hot compaction, to produce the composite material.

The resulting composite material comprises an alloy matrix and a reinforcing network of the metal oxide. Thus, an interpenetrating, interconnected network of reinforcing metal oxide is formed and associated with an alloy by a single reaction step. No subsequent treatment ("post-reaction treatment") is required for the production of the subject composite materials having superior properties such as increased strength and resistance to high temperatures, corrosion, and oxidation.

The process can also include the addition of an amount of pre-formed alloy or additional mounts of the metal oxide to the reaction mixture. The pre-formed alloy can also be treated, as in step (1), prior to its inclusion in the reaction mixture of step (2). The pre-formed alloy of the matrix can slow the reaction so that pressures can be maintained. A composite formed by the process which includes pre-formed alloy as a component of the reaction mixture has shown the highest fracture toughness. The subject process can be applied to a large number of alloys or metal oxides.

In one embodiment of the subject invention, Al powder is oxidized by exposing it to moist or humid air for a period of time such that the particles of the aluminum powder have an alumina surface layer formed thereon (step 1). The aluminum powder with alumina surface layer is mixed 1:1 with Ni powder (non-treated), and about 20% of NiAl pre-formed alloy is added to form the reaction mixture (step 2). The reaction mixture is subjected to RHC in which the temperature is brought to about 1250° C. under 50 MPa pressure (step 3) and held for about 25–30 minutes.

The subject composites advantageously overcome the inherent low room temperature damage tolerance of nickel aluminide, while maintaining the desirable properties of excellent oxidation resistance, wide solubility range for alloying, low cost materials, high hardness and good thermal conductivity. The composite materials produced by the subject process are of higher density lower porosity) than composites produced by the previously known processes. The effective thermal expansion coefficient can be varied across a relatively wide range (10–15.1 ppm/°C.) to tailor the material to a wide variety of specific applications. The fracture toughness in the NiAl—$Al_2O_3$ composite of the subject invention, found to be nearly 14 MPa$\sqrt{m}$ at about 18 volume percent alumina, was further increased to 16 MPa$\sqrt{m}$ using water quenching from 1200° C., and was structurally insensitive to cooling rate from elevated temperatures.

The composites of the subject invention can be useful as high-temperature structural material for various mechanical applications including utility for combustion engine materials. The subject composites have advantages over, and thus can replace, presently available materials such as nickel- and cobalt-based superalloys which have known disadvantages. Substituting the subject composite for nickel- and cobalt-based superalloys as a high-temperature structural material can allow higher operating temperatures and thus improved efficiencies in, for example, turbine engines.

BRIEF DESCRIPTION OF THE DRAWINGS

◻=non-post-reaction treated composite having the aluminum component oxidized in humid air (p$H_2$O=0.067 atm); ■=post-reaction-treated (annealed) composite having the aluminum component oxidized under humid conditions; ●=post-reaction-treated (water-quenched) composite having the aluminum component oxidized under humid conditions.

DETAILED DISCLOSURE OF THE INVENTION

The subject invention concerns novel compositions which are useful as a structural material in articles of manufacture subjected to high temperatures during operation of the manufactured article. The subject invention also concerns novel methods of making the composite and methods of use. The novel compositions comprise a metal alloy as a matrix and metal oxide as a reinforcing network. The metal alloy preferably comprises at least two different metal elements, one of which is typically a transitional element, e.g., nickel, niobium, molybdenum, and the like, and the other is typically an element of Group III or IV of the periodic table, e.g., aluminum or silicon, which can bond to or form an alloy with the first transition element. A preferred embodiment of the subject invention employs nickel and aluminum powders, both commercially available, to form the matrix alloy comprising nickel aluminide (NiAl). For simplicity and clarity, the description of the subject invention provided herein exemplifies NiAl used as the preferred alloy comprising the matrix. However, it would be understood by persons of ordinary skill in the art that other elements having like properties to Ni and Al can be used in place thereof to arrive at other composites which are considered part of the subject invention.

The process of the subject invention comprises a treatment, e.g., oxidation, of one or more of the elemental metal components of the matrix alloy to form a layer of metal oxide on the metal, and reacting the matrix alloy components in the presence of the network reinforcement component using reactive hot compaction (RHC). Pre-formed alloy can also be included as part of the reaction mixture comprising the matrix alloy components. The network reinforcement component is preferably the metal oxide formed as a layer on the matrix component(s), but can be separately added to the reaction mixture. The subject process advantageously produces a final product having an interconnecting reinforcement network about the metal alloy matrix. The matrix/reinforcement network structure of the composite results in a composite having, inter alia, increased strength, durability, and resistance to corrosion.

The subject process has the additional advantages of being simple to perform, which can eliminate costly and error-prone steps utilized in conventional composite-forming processes. A preferred application of the process of the subject invention is for the production of intermetallic and ceramic matrix composites, where high heats of formation of the matrices can aid in the formation of a whisker-like network which reinforces the matrix.

Any known consolidation process can be used to form the subject composite. For example, reactive hot compaction (RHC), hot extrusion, hot chamber injection molding, hot pultrusion, shock wave synthesis, electric discharge synthesis, and the like, can be used. It would generally be understood that a preferred consolidation process involves simultaneous application of heat and pressure to the reaction mixture. A preferred consolidation process can be reactive hot compaction whereby the composite is formed by a combination of chemical reaction of the matrix, externally supplied pressure, and the evolution of intense heat of formation of the matrix. RHC is also known as reactive sintering, combustion synthesis, reactive synthesis, self-propagating reactive synthesis, reactive processing, and gas-less combustion synthesis.

In the RHC procedure, the starting species forming the matrix product are intimately mixed. Reaction between the metallic elements forming the matrix alloy is initiated when the mixture is heated under pressure in a hot press, for example. The heat of formation of the reaction products formed in the hot press procedure, which can provide intense localized temperatures, is transferred to the surrounding material which, in turn, can accelerate the reaction. For producing a solid product, the reaction can be carried out in a way such that the size of the interparticle voids are controlled during the reaction. During formation of the final product, an intermediate reaction product in the liquid state can easily penetrate between matrix alloy particles during the reaction. Intense localized heating can also cause localized melting of the reactants and/or products which can aid densification of the composite product. Externally applied pressure, the timing and magnitude of which can be controlled, can further aid densification. The parameters used to control the reaction and the final density, as would be understood by ordinarily skilled artisans, include: initial powder sizes and distribution, heating rate, timing and magnitude of pressure, maximum pressure, and dilution of reactants, with a pre-reacted product.

A preferred example of a composite of the subject invention is alumina-reinforced beta-NiAl. This composite can be made using the subject process which comprises (1) treating aluminum powder by oxidizing the powder under hydrating conditions to form a surface layer of oxide or hydroxide on the particles of aluminum powder, wherein the oxide comprises alumina; (2) mixing a stoichiometric ratio of Ni powder and Al powder having a surface layer of alumina, and including an amount of preformed NiAl alloy to form the reaction mixture; (3) hot pressing the reaction mixture under high temperature and pressure for about 25-30 minutes to form a composite which comprises a NiAl matrix reinforced with the $Al_2O_3$ network. Other oxides, or hydroxides of aluminum which can be formed at the initial oxidation step (1) are converted to $Al_2O_3$ during the hot pressing. The alumina becomes sintered in the process to form an interconnecting reinforcement network.

Also, the subject composites can be formed by blending small (0.3 micron diameter) $Al_2O_3$ particles in with the powder mixture, and then hot pressing. In these cases, hydrating the alumina at room temperature prior to hot pressing was shown to result in a significant increase in the NiAl/$Al_2O_3$ interface strength in the composites. The high interfacial bond strength between the component phases, coupled with a high thermal expansion coefficient mismatch, allows dispersement of mechanically- or thermally-induced stress such that crack propagation can be extenuated or mitigated.

Pre-treatment, or treatment prior to the consolidation step, of one or more of the components of the reaction mixture to form a layer or coating of metal oxide surrounding the particles of the metal element can be used as a component of the reaction mixture. Subjecting the resulting metal oxide in the reaction mixture results in the formation of a reinforcement network throughout the composite. The details of the process can perhaps be best described by using the example of alumina-reinforced beta-NiAl. In a preferred process, aluminum powder is "pre-treated," i.e., oxidized prior to reacting the components, to form a layer of alumina ($Al_2O_3$) on the surface of the aluminum powder. Next, a single reactive hot compaction step is carried out on the reaction mixture comprising Ni and Al powders where the aluminum is pretreated to form an alumina shell thereon. This single reactive hot compaction step forms the alloy, nickel aluminide (NiAl). The resulting NiAl matrix having the $Al_2O_3$ reinforcement network is the subject composite. Nickel aluminide, itself, is a comparatively brittle material. The interfacial bonding at the alumina-NiAl interface throughout the subject composite can reduce the brittleness of the material by introducing a mechanism to effectively generate mobile dislocations into the NiAl matrix during thermal cycling.

The pre-treatment step or oxidizing of the metal element can be carried out on either Al or Ni powders. In a preferred embodiment, the pre-treatment step is the oxidation of aluminum powder carried out in a hydrating atmosphere. The hydrating atmosphere, preferably at temperatures ranging from 65° C. to 585° C., can be humid air which has a partial pressure of water ($pH_2O$) of more than 0.03 atmospheres (atm). The $pH_2O$ is preferably between about 0.037 and 0.1 atm and is most preferably about 0.067 atm. It is also preferred to maintain the hydrated conditions of the matrix component until it is subjected to the consolidation step. For example, the oxidized aluminum powder can be left at room temperature in humid conditions so that drying of the retained moisture is minimized.

The Ni and Al powders, where the aluminum powder has been treated so as to form a layer of alumina thereon, can be mixed, preferably in stoichiometric ratios, e.g., 1:1 Ni:Al, to form an alloy reaction mixture. NiAl as a pre-formed alloy can also be included as part of the reaction mixture. Pre-formed NiAl from about 6 volume percent (6 v/o) to about 35 volume percent (35 v/o) was found to successfully produce the subject composite. Volume percentages of about 15 to 20 v/o of pre-formed alloy are preferred, and about 18 v/o pre-formed alloy is most preferred. Also during the reaction, the alumina shells become sintered together, forming the network reinforcement structure.

This mixing step is followed by consolidating the mixture, e.g., by RHC, to initiate the reaction, thus forming a NiAl alloy matrix reinforced with a continuous network of $Al_2O_3$. In the consolidation step using RHC, the temperature is raised about 120° C. per minute to at least 900° C., preferably to about 1250° C. The reaction was carried out at a temperature of up to 1350° C. The composite is formed generally by the time the temperatures are reached, and can be completely carried out in this time. Preferably, however, the peak temperature and pressure are maintained for about 25-30 minutes. Pressures of about 40-85 MPa are preferred during RHC and 50 MPa was most preferred. The powders are oxidized to form an outer shell of NiO in the case of Ni powder and include alumina and complex hydroxides in the case of Al powders. The oxides of both nickel and aluminum are converted to alumina during hot pressing. The alumina ($Al_2O_3$) fragments become sintered in the process to form an interconnected network. Oxidizing the powder of the alloy, NiAl, can also be used followed by sintering in a hot press.

In one embodiment of the subject process, composites have been formed by mixing small (approximately 0.3 micron diameter) $Al_2O_3$ particles with the alloy reaction mixture, and then hot pressing. For this embodiment, the reaction mixture can comprise elemental Al and Ni powders in addition to pre-alloyed NiAl. The pre-formed NiAl alloy is formed by the reactive synthesis of Ni and Al elemental powders. In these cases, in which $Al_2O_3$ is introduced into the hot press, hydrating the alumina at room temperature prior to hot pressing was shown to result in a significant increase in the $NiAl/Al_2O_3$ interface strength of the composites.

The reaction occurring by hot press compaction of the reaction mixture is explosive in nature and evolves a tremendous amount of heat in the process. The addition of a pre-formed alloy to the alloy-forming metal components can advantageously slow the reaction. In a preferred process, the addition of about 20% by volume pre-reacted NiAl has been shown to slow the reaction, which can aid in the densification of the composite and thus form an advantageous composite product. Additionally, the use of aluminum powder pre-oxidized in humid air at temperatures ranging from 65° C. to 585° C. to form surface oxides on the aluminum has resulted in production of superior composites. The metal oxides, present to varying degrees on all aluminum, have been previously described as being a detriment to powder metal production, and much intense effort has been undertaken to minimize them. The current process is in complete contrast to the prior teachings and has shown the oxides can be used as an extremely valuable asset in the formation of composites having superior properties.

The oxidation treatment was found to contribute to the development of alumina morphology which can maximize fracture toughness. The level of humidity during the oxidation of the powders is one factor that can affect the characteristics of the composite. When the alumina was formed under conditions where the partial pressure of water was about 0.067 atm, the resulting fracture toughness of the exemplified material was 14 MPa√m. Higher fracture toughness measurements have also been observed for the subject composites.

The pre-oxidation of the metallic elements forming the matrix can also affect the chemical reaction that gives rise to the unique microstructure of the disclosed composites. The explosive nature of the reaction can fragment the oxide surfaces of the powders. The release of the heat of formation, producing intense local heating, can fuse together the $Al_2O_3$ to form a network throughout the reacting Ni and Al. The result is a composite comprising two continuous, interconnected, interpenetrating phases: one nickel aluminide and the other alumina.

Figure 1:
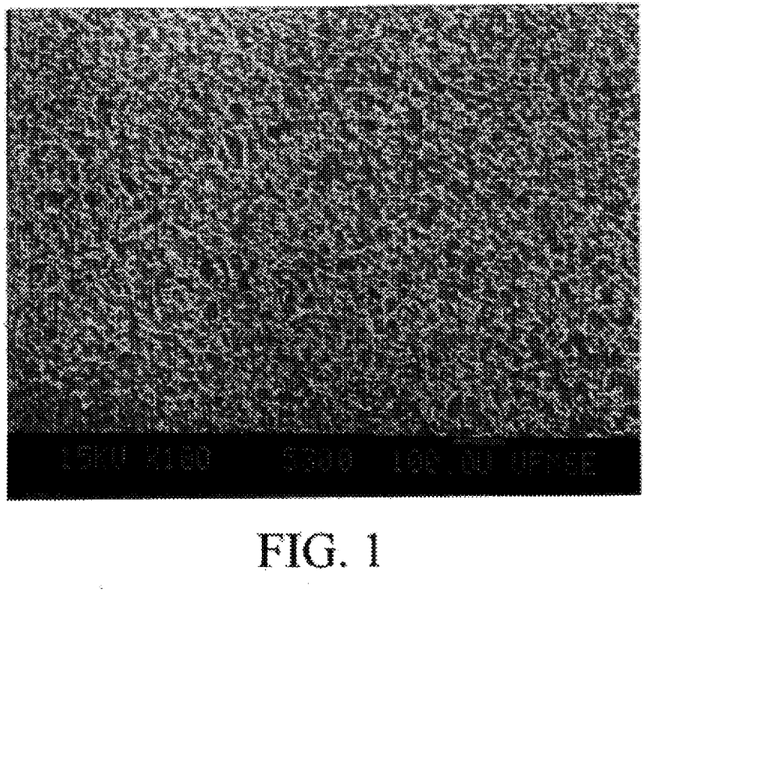
FIG. 1 shows the unique microstructure of the material at low magnification. The nickel aluminide matrix has been chemically etched away to reveal the three-dimensional structure and uniform distribution of the alumina reinforcement network of the NiAl—$Al_2O_3$ composite.
Figure 2:
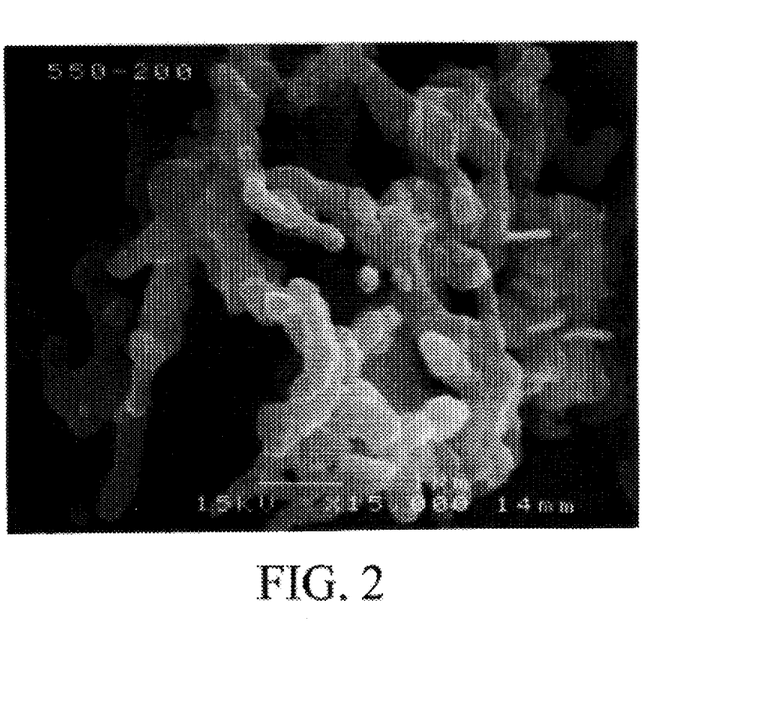
FIG. 2 is a scanning electron micrograph (SEM) showing the morphology of the alumina reinforcement network (revealed by etching away the NiAl matrix) formed by oxidizing alumina powder in air at p$H_2$O=0.061 atm.

The unique reinforcement network microstructure of the subject composite material is shown in FIGS. 1 and 2. FIG. 1 is the subject composite under low magnification, showing the uniform distribution of the network, and FIG. 2 shows the alumina reinforcement under higher magnification to illustrate the interconnecting network structure. The nickel aluminide matrix was chemically etched away to reveal the three-dimensional structure of the alumina network.

X-ray diffraction analysis shows that the aluminum powder, after oxidation, consists of only Al, $Al_2O_3$, and various forms of hydrated alumina. Nickel oxide has not been observed in the final microstructure optically, on the electron microprobe, nor in X-ray diffraction data. Thus, any other oxide, e.g., NiO, initially present is reduced to alumina during the reaction.

The exemplified process produces NiAl and $NiAl-Al_2O_3$ composites, or more specifically, beta-NiAl reinforced with an in situ network of alumina. The subject composites displayed high room-temperature fracture toughness over 14 MPa√m in the as-hot pressed condition, compared with 6 MPa√m for the unreinforced material. Post-reaction treatment of the composite, e.g., quenching into water from 1200° C., further increased the toughness to nearly 16 MPa√m. No cracking was observed to result from the stress produced as a consequence of the high cooling rate and the large thermal expansion mismatch between NiAl and $Al_2O_3$.

At 23 volume percent alumina, grain growth was virtually eliminated at 1200° C., indicating the potential for a highly creep-resistant material. In addition, the volume fraction alumina and the morphology did not significantly change during 200 hour exposure to 1200° C. temperature, which suggested a very stable microstructure. Thus, the subject composite overcomes the inherent low room temperature damage tolerance of nickel aluminide, while maintaining all the desirable properties such as excellent oxidation resistance, wide solubility range for alloying, low cost materials, high hardness and good thermal conductivity, and at the same time enhances the already low specific density.

The subject composite retains the beneficial properties of the matrix alloy and the beneficial properties of the network material without introducing any negative characteristics. Corrosion resistance, especially the resistance to high temperature oxidation, is one of the primary advantages of utilizing NiAl as a structural material in high temperature oxidizing environments such as turbine engines. NiAl is currently used as a protective coating on Ni-based superalloys. NiAl possesses superior oxidation resistance due to the natural formation of a continuous $Al_2O_3$ outer surface layer. This layer, once formed, has been shown to prevent further interaction between the atmosphere and the base NiAl. With the addition of the $Al_2O_3$ network as in the subject composite, the material is significantly strengthened, and the advantageous corrosion resistance property of $Al_2O_3$ is not diminished.

The high thermal conductivity property of NiAl provides an advantage over Ni-based superalloys by reducing the temperature gradients in an operating turbine engine. This eliminates hot spots and thus the maximum temperature which the material is subjected to is reduced.

The materials produced with the process are of higher density (lower porosity) than other materials produced by other metallurgical means. The effective thermal expansion coefficient can be varied across a relatively wide range (10–15.1 ppm/°C.) to tailor the material to a wide variety of specific applications. The stoichiometric composition can be beneficial in aircraft engine manufacture, because it corresponds to a high melting temperature.

The subject composites can be used in processes which are currently known and available to produce an article of manufacture. The adaptation of these manufacturing processes using the subject composite would be readily recognized and understood by persons of ordinary skill in the art.

Following are examples which illustrate procedures, including the best mode, for practicing the invention. These examples should not be construed as limiting. All percentages are by weight and all solvent mixture proportions are by volume unless otherwise noted.

EXAMPLE 1

Production of a Composite

The metallic elements forming the alloy matrix were preoxidized in a hydrating atmosphere. Oxidation of the metallic elements comprises heating the powder under hydrating conditions, to a desired temperature and holding at that temperature for a particular period of time. Nickel powder, which has a particle diameter of approximately 2.2 to 3.0 microns (average=2.5 microns), was oxidized at 500°–550° C. for up to 20 minutes. The aluminum powder, which has an approximate diameter of 3 to 4 microns, was oxidized at temperatures ranging from room-temperature to 585° C. and complete oxidation can take up to 400 hours. Oxidation of aluminum powder at 550° C. for 100 hours was found to be the optimum temperature and time for that metal element. Oxidation of the aluminum can be accelerated by using a pure oxygen atmosphere, or by boiling water in an autoclave followed by calcining to convert hydroxyls back into oxides prior to hot pressing. A range of humidities (or partial pressures of water, $pH_2O$) from 0.01 atm (dry) to about 0.07 atm (moist) were used in the subject process. Hydrating conditions of about 0.067 atm $pH_2O$ were preferred for producing a layer of alumina on the aluminum powder. The partial pressure of water used for nickel was about 0.061 atm. In addition, mixing Al powder with water at a range of pH values (pH 4–10) and at room temperature was found to produce a hydrated oxide on the surface of the Al powder. Irrespective of the initial hydrating procedure of the alloy components, it is preferred to maintain the component at room temperature to maintain its hydrated condition for the RHC step.

In the preferred embodiment using treated aluminum powder and untreated nickel powder, the powders were screened and weighed. The treated aluminum powder, now having a surface layer of $Al_2O_3$, was mixed in a stoichiometric ratio, usually 1:1, with the untreated Ni powder. In a preferred embodiment, pre-formed NiAl alloy was added to this mixture.

The pre-formed nickel aluminide alloy (7 to 10 micron diameter) was added at an mount of about 18–20% by volume to the mixture of aluminum and nickel powder. The aluminum and nickel powders and the pre-formed NiAl alloy formed the reaction mixture. This reaction mixture was mixed in a rotary mixer for about one hour.

The reaction mixture was placed in a boron nitride-lined graphite die. The die was vibrated to help increase green density. The die containing the reaction mixture was then placed in a vacuum hot press chamber, and heated to 1250° C. at a rate of 120° C. per minute. During the heating step, the pressure was maintained at 50 MPa. Constant pressure can be maintained, for example, by advancing the hot press ram to compensate for the decrease in volume of the reaction mixture. At 1250° C., the pressure of 50 MPa was maintained for 25 to 30 minutes, then released for five minutes. The temperature was decreased to room temperature at about 5° C. per minute.

Humidity during pre-oxidation can be related to spalling and the integrity of the resulting oxide shells. It was found that the alumina network can take the form of partially-connected spheres when not hydrated or is formed as interconnected rods under hydrating conditions.

For composites made from preoxidized aluminum, for example, morphology depended substantially on the partial pressure of water in the oxidizing atmosphere. The alumina network (NiAl is etched away) of the composites shown in FIG. 2 are produced by oxidizing the aluminum powders at $pH_2O=0.061$ atm. The powder was oxidized for 200 hours. This micrograph shows that the alumina network formed a rod-like, interconnected morphology.

A composite material with continuous network of rod-like reinforcements can resist cracking or spalling better than a composite that does not have the continuous network of rod-like reinforcements.

EXAMPLE 2

Surface Hydration, and Other Reaction Environment Factors

By diluting the Ni+Al powder mixture with approximately 20 volume percent (v/o) of pre-formed NiAl alloy powder, the reaction rate of the RHC step was slowed. In this manner, high densification of the composite was achieved. Close to 100% densification was achieved in composites containing 20 v/o alumina or less. Above 20 v/o nickel aluminide, about 2% porosity remained in the microstructure. The use of pre-formed alloy can slow the reaction time, which can allow the advancement of the hot press ram during the reaction, thereby maintaining generally isobaric conditions of about 50 MPa throughout the RHC step. This resulted in the virtual elimination of all porosity that normally resulted in the sintered powder products. This greatly reduced the processing time, temperature, and number of steps, compared to currently known processes.

The advantageous characteristics of the composite material of the subject invention include (1) an increase in room-temperature fracture toughness, (2) fracture mode as determined by analysis of fracture surfaces, and (3) a significant increase in the dislocation density, compared to composites produced without hydrating the aluminum at room temperature.

The diameter, spacing, and volume fraction of the alumina reinforcements are controlled by a combination of particle size and distribution, oxidation temperature and oxidation time. A composite containing 16.7 v/o alumina which had been annealed for 200 hours at 1200° C. revealed a duplex grain structure which resulted from the different size distributions of the starting powders. The Ni powder was about 2–6 μm in diameter whereas the Al powder was about 4 μm in diameter. The prealloyed NiAl powder was about 10 μm with some particles up to 20 μm in diameter. Previously, alumina reinforcements in materials typically used $Al_2O_3$ fibers having diameters on the order of tens of microns. The aluminum reinforcement network formed by the subject process in the subject composite is less than 0.3 microns in diameter. This is below the size threshold which creates matrix cracking due to thermal expansion mismatch. Additionally, conventional composites utilizing artificial reinforcements in this size range (0.3 microns), besides being extremely difficult to produce, provide very little of a toughening increase to NiAl.

EXAMPLE 3

Post-Reaction Treatment of the Composite

Long-term high-temperature annealing was found to have little effect on the toughness of the subject composite, as can be seen from the data for the specimens annealed at 1200° C. for 100 hrs., then furnace cooled at 3° C./minute. On the other hand, water quenching from 1200° C. after a 12 hour soak increased the fracture toughness to a peak of nearly 16 MPa√m at 16 volume percent alumina.

EXAMPLE 4

Characteristics of Composites

The process described herein, using RHC as the consolidation procedure, was used to produce disk-shaped composites. The hot pressed disks were electric-discharge machined (EDM) to form rectangular cross-section specimens. The disc-shaped composites were isotropic by the tests conducted. Testing showed the toughness to be the same in both parallel and perpendicular axes to the hot press at less than 10 volume fractions of alma. The composite was anisotropic at volume fractions of alumina higher than 10. The subject composite has a melting temperature of 1955K and a density less than 5.9 g/cm$^3$.

Fracture toughness. Chevron-notched four-point bend testing at a constant cross-head speed of 0.002 inches per minute was conducted to determine the fracture toughness of the composites. The four-point bend tests were also conducted on composites that were post-reaction treated. Post-reaction treated composites are those that were annealed (1200° C. for 100 hours, furnace cool at 3° C./minute), or that were annealed and quenched (1200° C. for 12 hours, quench into water at 5700° C./minute).

Fracture toughness determinations for the composites of the subject invention were also made from the peak load obtained on chevron-notched four-point bend testing of rectangular bars. The results of fracture toughness testing for composites produced from Al powders oxidized under different conditions are shown in FIG. 3.

Figure 3:
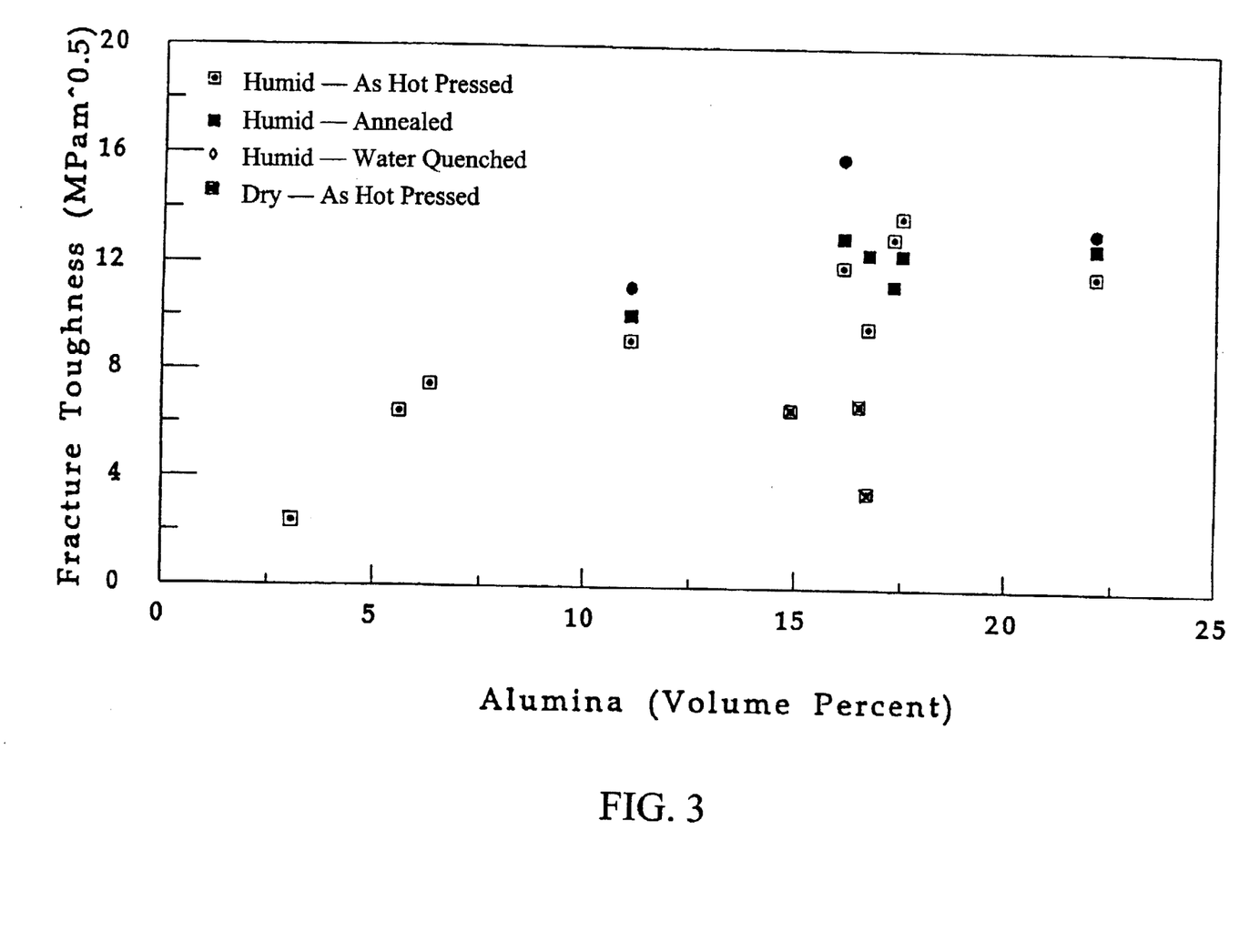
FIG. 3 shows the results of fracture toughness testing for composites produced from Al powders oxidized under different conditions. Each point is the average from at least three specimens. Fracture toughness is plotted as a function of alumina content (in NiAl—$Al_2O_3$ composites) produced by oxidizing Al powders in humid air (p$H_2$O=0.061 atm) and dry air (p$H_2$O=0.011 atm) at 575° C. Legend: X=non-post-reaction treated composite having the aluminum component oxidized in dry conditions (p$H_2$O=0.011 atm)

As shown in FIG. 3, the specimens produced from Al oxidized in dry air (pH$_2$O=0.011 atm) showed no increase in fracture toughness over the unreinforced NiAl matrix, typically reported to be 4–6 MPa√m. However, when the Al powders were oxidized in a humid air atmosphere (pH$_2$O= 0.067 atm), the fracture toughness increased monotonically with Al$_2$O$_3$ content up to about 14 MPa√m at 18 volume percent Al$_2$O$_3$. Fracture-toughness dropped slightly for composites having an alumina content of 25 volume percent. Long-term high-temperature annealing was found to have little effect on the toughness, as can be seen from the data for the specimens annealed at 1200° C. for 100 hrs., then furnace cooled 3° C./minute. On the other hand, a composite having 16 volume percent alumina and water quenched from 1200° C. after a 12 hour soak increased the fracture toughness to a peak of nearly 16 MPa√m.

Fracture toughness testing of the subject composite material, as a function of volume percent alumina compared to the monolithic material, showed a clear advantage of the subject material. The fracture toughness in composites produced with hydrated alumina-containing powders was insensitive to moderate changes in the cooling rate from elevated temperatures. This is a significant improvement over monolithic NiAl, which shows a large effect on cooling rate.

The mechanically or artificially reinforced materials had an average fracture toughness of 11.9 MPa√m which is 40% less than toughness obtained in samples with the network of a slightly lower volume fraction (18 v/o). The value of 11.9 MPa√m corresponds to the maximum attained for any Al$_2$O$_3$ reinforcements previously reported. This confirms superiority of the network composites to particulate, fiber, and whisker composites which have been previously reported.

Thermal expansion coefficient. The subject composite showed a reduction in the expansivity of the subject composite. It is thus an advantageous thermal expansion coefficient as compared to previously known materials.

Creep/grain growth. These two properties are intimately related and indicate the high temperature stability of the material. NiAl has very low high temperature strength, excessive grain growth rates and thus detrimental creep properties. By contrast, the subject composite, as indicated by preliminary grain growth at 1200° C. for 200 hours, showed that grain size of this material can be totally dependent on the spacing between Al$_2$O$_3$ reinforcements. Immediately after fabrication the grains were related to the starting powder diameters, but annealing allowed grain growth until the grain boundaries impinged on the reinforcements, where grain growth effectively ceased. These data indicate that creep, which correlates positively with elevated temperature strength, is not a problem with this material.

It should be understood that the examples and embodiments described herein are for illustrative purposes only and that various modifications or changes in light thereof will be suggested to persons skilled in the art and are to be included within the spirit and purview of this application and the scope of the appended claims.

References

Alman, D. E., N. S. Stoloff (1991) "Powder Fabrication of Monolithic and Composite NiAl," *Int. J. Powder Met.* 27(1):29–41.

Barinov, S. M., V. Y. U. Evdokimov (1993) "Zirconia-Toughening of Nickel Aluminide," *Acta Metall. Mater.* 41(3):801–804.

Brzeski, J. M., J. E. Hack, R. Darolia, R. D. Field (1993) "Strain Aging Embrittlement of the Ordered Intermetallic Compound NiAl," *Mat. Sci. Eng.* A170:11–18.

Hack, J. E., J. M. Brzeski, R. Darolia (1992) "Evidence of Inherent Ductility in Single Crystals of the Ordered Intermetallic Compound NiAl," *Scripta Metall. Mater.* 27:1259–1263.

Henager, C. H., J. L. Brimhall, J. S. Vetrano, J. P. Hirth (1992) "In Situ Synthesis of MoSi$_2$/SiC Composite Using Solid State Displacement Reactions," In *Intermetallic Matrix Composites II*, eds. D. B. Miracle, D. L. Anton, J. A. Graves, MRS Conf. Proc., Vol. 273, San Francisco, Calif., pp. 281–287.

Locci, I. E., R. D. Noebe, R. R. Bowman, R. V. Miner, M. V. Nathal, R. Darolia (1990) "Microstructure and Mechanical Properties of a Single Crystal NiAl Alloy with Zr or Hf Rich G-Phase Precipitates," In *High Temperature Ordered Intermetallic Alloys IV*, MRS Conf. Proc. Vol. 273, Boston, Mass., pp. 278–286.

Lu, L. (1990) "Reactive Hot Compaction Process for Fabrication of NbAl$_3$ Matrix Composites," Masters Thesis, University of Florida.

Miracle, D. B. (1993) "The Physical and Mechanical Properties of NiAl," *Acta Metall. Mater.* 41(3):649–684.

Rigney, J. D., J. J. Lewandowski (1992) "Effects of Reinforcement Size and Distribution on Fracture Toughness of Composite Nickel Aluminide Intermetallics," *Mat. Sci. Eng.* A158:31–45.

I claim:

1. A composite material consisting essentially of a NiAl matrix, and an in situ Al$_2$O$_3$ reinforcement network, wherein said matrix and reinforcement are substantially continuous, interconnecting, interpenetrating, and interfacially bonded.

2. A composite material consisting essentially of a NiAl matrix, and an in situ Al$_2$O$_3$ reinforcement network, wherein said matrix and reinforcement are substantially continuous, interconnecting, interpenetrating, and interfacially bonded, wherein said composite is water quenched and has a fracture toughness of at least 16 MPa√m.

* * * * *

UNITED STATES PATENT AND TRADEMARK OFFICE
CERTIFICATE OF CORRECTION

PATENT NO.    :    5,705,280

DATED         :    January 6, 1998

INVENTOR(S)   :    Herbert W. Doty

It is certified that error appears in the above-identified patent and that said Letters Patent is hereby corrected as shown below:

Column 5, line 13: "mounts" should read --amounts--.

Column 11, line 35: "mount" should read --amount--.

Column 13, line 6: "alma" should read --alumina--.

Signed and Sealed this

Twenty-first Day of April, 1998

*Attest:*

BRUCE LEHMAN

*Attesting Officer*    *Commissioner of Patents and Trademarks*